July 22, 1930.  R. J. WENSLEY  1,770,961
MEANS FOR PROTECTING SYNCHRONOUS MACHINERY
Filed Dec. 9, 1927
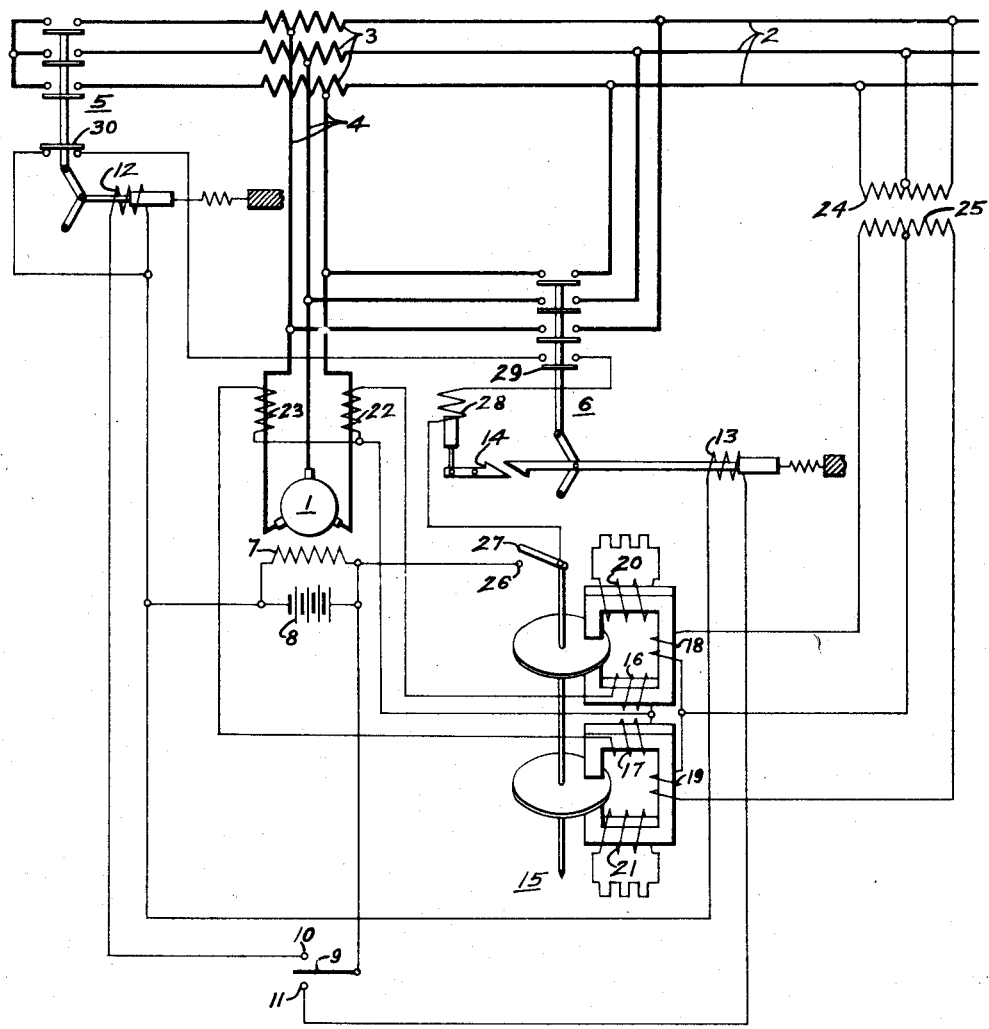
INVENTOR
Roy J. Wensley
BY
ATTORNEY Patented July 22, 1930

1,770,961

UNITED STATES PATENT OFFICE

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA

MEANS FOR PROTECTING SYNCHRONOUS MACHINERY

Application filed December 9, 1927. Serial No. 238,798.

My invention concerns a method of protecting synchronous machinery, for example, synchronous motors. Such motors are widely used to correct the power factor and the voltage of transmission lines and, in such applications, the motor is frequently automatically or remotely controlled.

It has been observed that, when the line voltage of the system supplying power to a synchronous condenser fails, the inertia of the moving parts of the machine tends to maintain the voltage on the line and thereby prevent the operation of no-voltage protective devices. Under such conditions, if the supply is again established before the protective devices operate, the condenser will be subjected to possible damage.

One object of this invention is to provide a protective system for a dynamo-electric machine—specifically, a synchronous condenser—which will function to disconnect the machine from its feeder whenever the energy supply fails, regardless of the maintenance of the line voltage because of the inertia of the moving elements of the machine.

Another object of this invention is to provide a relay which will close a circuit-breaker-tripping circuit when the voltage of the line fails or when the machine supplies energy to the line.

Another object of this invention is to provide a protective relay capable of discriminating between normal operating conditions and failure of the voltage supply, even though the machine maintains the line voltage.

A further object of my invention is to utilize a contact-making watthour meter as a relay for protecting dynamo-electric machinery against failure of the line voltage.

According to the invention, I employ a standard polyphase watthour meter provided with suitable contacts, as a relay for protecting synchronous machines. The light-load compensating coils of the meter are so adjusted for over-compensation that, when voltage only is applied to the relay windings, the moving element and the associated contacts will "creep" to the circuit-closing position.

The current coils of the relay are so connected that, when energy is absorbed by the machine, the moving element of the relay will cause the contacts to be opened. A reversal of the direction of flow of energy, of course, will cause the direction of rotation of the moving element to be reversed, so that it tends to close the contacts.

By this arrangement, if a synchronous condenser protected by my relay is on an isolated line, the relay will operate to close its contacts and trip the main circuit breaker when the supply voltage is interrupted. If, however, other load devices are connected to the line, and the condenser tends to supply energy thereto, the relay will further act as a reverse-power relay and trip the breaker. By this means, the condenser is completely protected against possible damage resulting from a restoration of the supply voltage after a momentary interruption.

For a complete understanding of my invention, reference should be had to the accompanying drawing, the single figure of which is a circuit diagram of the protective system of my invention.

Referring to the drawing, a synchronous motor 1, which is employed as a power-factor-correcting means, is supplied with energy from a source 2. A compensator 3 having starting taps 4 is provided for starting the motor on reduced voltage. A starting switch 5 controls the application of reduced voltage to the motor armature. A running switch 6 serves to connect the motor armature directly to the source 2 when the motor has attained substantially synchronous speed.

The motor 1 is provided with a field winding 7 energized from any suitable direct-current source, as an example of which is illustrated a battery 8.

In this embodiment of my invention, I have illustrated a manually controlled synchronous motor, but it is to be understood that any method of automatically controlling the starting of the synchronous motor, either in response to circuit conditions or by remote control, may be substituted for the manual controlling means illustrated.

For controlling the starting of the motor 1, a single-pole double-throw switch 9 is provided, having fixed contacts 10 and 11.

When it is desired to start the motor 1, the switch 9 is moved into engagement with the contact 10 to complete a circuit from the battery 8 through the switch 9, contact 10 and the operating coil 12 of the starting switch 5 and thence back to the batery 8. The resulting operation of the starting switch 5 energizes the starting taps 4, and the motor 1 is started on reduced voltage in a well known manner.

When the motor has reached substantially synchronous speed, the switch 9 is moved to engage the contact 11, thereby breaking the circuit through the operating coil of the starting switch 5, which is thereupon opened, and completing a circuit from the battery 8 through the switch 9, contact 11 and the operating coil 13 of the running switch 6 and thence back to the battery 8.

The energization of the operating coil 13 of the running switch 6 causes this switch to be closed, and to be latched in by the latch 14.

At 15 is indicated, generally, a contact-making watthour meter which I utilize as a relay for protecting the motor 1 against failure of the supply voltage. The meter 15 illustrated is of the usual induction type and is provided with current coils 16 and 17 and potential coils 18 and 19. The relay also is furnished with light-load compensating windings 20 and 21. The current coils 16 and 17 are energized, in accordance with the current supplied to the motor 1, by means of the current transformers 22 and 23 connected in the motor leads. The potential windings 18 and 19 are energized by means of the potential transformers 24 and 25 connected to the supply line 2.

The relay 15 is provided with a stationary contact 26 and a moving contact 27. The light-load compensating coils of the relay are so adjusted that, when voltage only is applied to the relay windings, the moving element of the relay will be actuated in such a direction as to effect the engagement of contact 27 with contact 26. Under normal operating conditions, the starting current will cause the current windings to be energized, as well as the potential windings, but connections are so made that, when the motor 1 is absorbing energy from the source 2, the moving element of the relay 15 will be actuated in such direction as to effect disengagement of the contacts 26 and 27. If the direction of energy flow, however, is reversed because the motor 1 acts as a generator to supply energy to the line 2, the rotation of the moving element of the relay 15 is reversed, and the contact 27 engages the contact 26.

Engagement of the contact 27 with the contact 26 completes a circuit from the battery 8 through the relay contacts, a trip coil 28, the function of which is to release the latch 14 which secures the circuit breaker 6 in the closed position, through an interlock switch 29, which is closed when the switch 6 is closed, and an interlock switch 30 which is closed when the starting switch 5 is open. The interlock 30 is provided for the purpose of interrupting the trip circuit during the starting of the motor 1, and the interlock 29 is provided to prevent energization of the tripping coil 28 while the switch 6 is open.

The operation of my protective system will be apparent from the above description thereof but a short summary of the operation is here given.

As long as the motor 1 is absorbing energy from the source 2, the contacts of the relay 15 will be disengaged. Should the supply voltage fail, however, so that, if the condenser is connected to an isolated line, no current will flow through the motor leads, only the potential coils of the relay 15 will be energized. As above explained, this results in the closing of the contacts 26 and 27 and the tripping of the switch 6 because of the adjustment of the compensating coils 20 and 21 of the relay 15. If the condenser 1 is connected to a line which supplies other load devices, instead of being connected to an isolated line, it will tend to supply current to said devices. The reversal of the direction of energy flow, however, will, as previously pointed out, cause the closing of the contacts 26 and 27 to effect the tripping of the breaker 6.

It is thus apparent that my invention obviates the disadvantage encountered in the use of the usual no-voltage protective devices, namely, that, by my system, upon a failure of the supply voltage, the machinery to be protected is disconnected from the source even though the line voltage is maintained at substantially its normal value because of the continued rotation of the moving elements of the machine.

Although I have illustrated and described but a single embodiment of my invention, it is apparent that changes will occur to those skilled in the art and it is my intention that such changes as fairly fall within the scope of the appended claims shall be considered as pertaining to my invention.

I claim as my invention:

1. A protective system for a synchronous alternating-current machine supplied with energy from a feeder comprising means for disconnecting the machine from its feeder, means for operating said disconnecting means and means for energizing said operating means, said energizing means being operatively responsive to the machine voltage, if the power current is interrupted, and to power output of the machine, if it tends to supply energy to its feeder, but non-operatively responsive to power input to the machine.

2. In a protective system for a dynamo-electric machine supplied with energy from a feeder, the combination with a circuit breaker for disconnecting the machine from its feeder, a trip coil for said circuit breaker of means for energizing said trip coil in response to the machine voltage when the power current is interrupted or in response to power output of the machine, if it tends to supply energy to the feeder, said means being non-operative in response to power input to the machine.

3. A protective system for a dynamo-electric machine supplied with energy from a feeder including a circuit breaker for disconnecting the machine from its feeder, a trip coil for said circuit breaker, a tripping circuit for said coil and a relay for closing the tripping circuit in response to the machine voltage, if the power current is interrupted, or to power output of the machine, if it tends to supply energy to its feeder, and for maintaining the tripping circuit open when the machine absorbs energy from the feeder.

4. In a protective system for a dynamo-electric machine supplied with energy from a feeder, a circuit breaker for disconnecting the machine from the feeder, a trip coil for said circuit breaker in a local circuit including a current source and the contacts of a relay, said relay tending to close its contacts in response to machine voltage when the power current is interrupted or when the machine supplies energy to the feeder and tending to open its contacts when the machine absorbs energy from the feeder.

5. Low-voltage protective means for a dynamo-electric machine including a relay for controlling the tripping circuit of the machine circuit breaker, means included in said relay for causing the contacts of said relay to be closed when the power current is interrupted, even though the machine continues to generate voltage and tends to supply energy to the feeder, and means included in said relay for opening said contacts when the machine absorbs energy from the feeder.

6. In a low-voltage protective device for dynamo-electric machines, a contact-making watthour meter including current and potential windings and having light-load compensating coils so adjusted that the moving element of the meter will "creep" toward the circuit-closing position when the potential winding of said meter is energized and the current winding de-energized.

7. In a protective system for a dynamo-electric machine, the combination with a tripping circuit for the machine circuit breaker, of a contact-making watthour meter for controlling said circuit, having light-load compensating windings so adjusted that the moving element will "creep" to the circuit-closing position when its potential winding only is energized.

8. In a protective system for a dynamo-electric machine connected to a feeder, a circuit breaker for disconnecting said machine from said feeder, a solenoid and local circuit for tripping said breaker, a relay including current and potential windings for controlling said circuit, said relay having a compensating winding so adjusted that, in response to energization of its potential winding only, it closes its contacts, and, in response to simultaneous energization of its current and potential coils, it closes or opens its contacts, according to the direction of energy flow, whereby said machine is disconnected from said feeder when the energy supply fails, even though the voltage of the machine energizes the feeder and tends to supply energy thereto.

9. In a protective system for a dynamo-electric machine adapted to be connected to a circuit through a circuit interrupter, means for tripping said interrupter and means responsive to the voltage of said circuit for causing the operation of said tripping means and means responsive to a flow of energy in a predetermined direction in said circuit for preventing the operation of said tripping means.

10. In a protective system for a dynamo-electric machine adapted to be connected to a circuit through a circuit interrupter, means for tripping said interrupter and means responsive to the voltage of said circuit for causing the operation of said tripping means and means responsive to a flow of energy in a predetermined direction in said circuit for assisting the operation of said voltage-responsive means.

11. In a protective system for a dynamo-electric machine; a circuit breaker for disconnecting said machine from the feeder with which it is associated and means for tripping said breaker including a directional relay energized from said feeder and embodying means for excessively compensating it for low current values whereby said breaker will be tripped in response to a failure of supply voltage even though said feeder remains energized by the machine voltage.

12. Means for detecting a failure of the energy supply for a dynamo-electric machine comprising a contact-making watthour meter including current and potential windings and light-load compensating means, said compensating means being so adjusted that the moving element of the relay will "creep" to contact-closing position when the potential coil only of said watthour meter is energized.

In testimony whereof, I have hereunto subscribed my name this 5th day of December, 1927.

ROY J. WENSLEY.